United States Patent [19]

Priesmeyer

[11] 4,095,610
[45] Jun. 20, 1978

[54] PRESSURE EQUALIZING SHOWER VALVE

[75] Inventor: Charles H. Priesmeyer, Park Ridge, Ill.

[73] Assignee: Powers Regulator Company, Skokie, Ill.

[21] Appl. No.: 781,290

[22] Filed: Mar. 25, 1977

[51] Int. Cl.² ............................................. F16K 19/00
[52] U.S. Cl. .................................. 137/100; 137/467; 137/119; 137/625.17
[58] Field of Search ................ 137/98, 100, 467, 119, 137/597, 625.17

[56] References Cited

U.S. PATENT DOCUMENTS

| | | | |
|---|---|---|---|
| 2,145,114 | 1/1939 | Gibbs et al. | 137/100 |
| 2,867,230 | 1/1959 | Bletcher et al. | 137/119 |
| 3,192,939 | 7/1965 | Moen | 137/100 |
| 3,601,141 | 8/1971 | Kishu | 137/119 |
| 3,603,347 | 9/1971 | Paolini | 137/625.17 |
| 3,688,790 | 9/1972 | Esten | 137/98 |
| 3,724,480 | 4/1973 | Povalski et al. | 137/98 |
| 3,826,274 | 7/1974 | Moen | 137/467 |
| 3,921,659 | 11/1975 | Rudewick | 137/98 |

Primary Examiner—William R. Cline
Assistant Examiner—H. Jay Spiegel
Attorney, Agent, or Firm—James B. Blanchard; S. Z. Szczepanski

[57] ABSTRACT

A valve for mixing liquids having different properties, maintains a selected flow ratio of the liquids despite pressure changes in the inlet lines, allows discharge through either of two outlets and permits regulation of the flow rate through either of the outlets. The valve includes a balancing poppet which senses pressure changes in inlet lines and adjusts flow rate to compensate therefor, means for regulating the ratio of two liquids entering the valve and a diverter for selecting the one of the two outlets and for regulating the flow rate through either of the outlets.

6 Claims, 6 Drawing Figures

PRESSURE EQUALIZING SHOWER VALVE

BACKGROUND OF THE INVENTION

This invention relates to mixing valves. In particular, it relates to mixing valves used for mixing liquids having different temperatures and for selectively controlling the flow of the mixed liquids between two outlets.

Water for home, commercial and industrial uses are usually supplied through two conduits, one of which carries water of ambient temperature and the other, hot water. For most applications water having the temperature somewhere between those of the two conduits is most desirable; consequently, a variety of mixing valves have been introduced to blend the cold and hot water in such proportions as to achieve the desired temperature at the valve outlet. The valves were further refined to permit selective guidance of the flow of mixed water through one of two outlets, such as between an outlet for a bathtub and one for the shower.

A principal object of this invention is to provide an improved mixing valve which senses and automatically adjusts for pressure changes in the inlet fluid lines and which permits regulation of the outlet flow through either of the outlets.

A further object of the invention is to provide an improved mixing valve having a maximum temperature selector which once set cannot be accidently exceeded during the normal operation of the valve, said maximum temperature selector adapted to provide two ranges of maximum temperatures.

Still another object of the present invention is to provide an improved mixing valve adapted to sense changes of the pressure in the inlet lines and to compensate for those so as to maintain the relative flow rates of cold and hot water at a constant level. The valve is compact, easily installable and requires minimum maintenance.

A still further object of the invention is to provide a mixing valve which can be installed at different distances from the surface on which the control fixture is located.

Still another object of the invention is to provide a mixing valve which maintains a constant, preselected temperature of water discharging therefrom, and which can direct the water flow through either of the two outlets permitting adjustment of the discharge flow volume through either of the outlets.

A still further object of the invention is to provide a valve for mixing water and for directing water to either shower or bathtub faucet by means of a diverter, which diverter cannot be accidently actuated or left in the shower position.

Still another object of the invention is to provide a valve which provides maximum protection against accidental scalding of the user.

Other objects of the invention will become apparent to those skilled in the art upon studying this disclosure.

BRIEF DESCRIPTION OF THE DRAWINGS

FIG. 3A is an elevational view taken along the line 3A—3A of FIG. 3.

BRIEF DESCRIPTION OF THE INVENTION

A valve for mixing fluids and for selectively directing the mixed fluids into one of two outlets, comprises a two compartment control chamber communicating with a mixing chamber and a diverter conduit communicating with an exit of the mixing chamber. Inside the control chamber there is a balancing poppet which comprises a flexible circular plate with two solid plates on either side thereof and cylindrical projections extending from each of the solid plates in the normal direction and having enlarged portions near the outer ends. The periphery of the flexible circular plate is secured to chamber walls; the circular plate subdivides the control chamber into two compartments. In the equilibrium position, the cylindrical projections fit through inlet openings of the control chamber; the enlarged portion of each cylindrical projection extends past inlet openings into the respective inlet chambers, which have larger cross-sections than those of inlet openings. When the pressure in one of the inlets decreases, the balancing poppet is forced to move in the direction of that inlet, causing the enlarged portion of the cylindrical projection on the opposite side of the flexible plate to move towards its inlet opening. In this position, the flow from the high pressure side is restricted and that from the low-pressure side is increased. A mixing plate at the end of a rotatably mounted shaft permits control of flow from either of the two compartments into the mixing chamber.

The diverter conduit has a slideable member therein adapted to assume two positions. The slideable member generally cylindrical in shape has an enlarged inner end fitting closely against walls of the diverter conduit and a stem. The enlarged end has a flat side wall extending part way along its length and has a hole through the enlarged non-flattened portion. When the member is in its contracted position, the fluid from the exit of the mixing chamber can pass through the hole into the first outlet of the diverter conduit; when the diverter is pulled into an extended position, the liquid is prevented from passing into the first outlet and instead is directed to a second outlet. By rotating the member, the communication between the mixing chamber and either of the diverter outlets can be restricted or closed-off. A spring inside the conduit and around the stem holds the member in the contracted position, but water pressure overcomes the resiliance of the spring when the member is moved into the extended position. The outer end of the member is provided with an extension arm threaded into the member to allow easy installation of the valve at a varying distance from the surface on which controls are located.

DETAILED DESCRIPTION OF THE INVENTION

Figure 1:
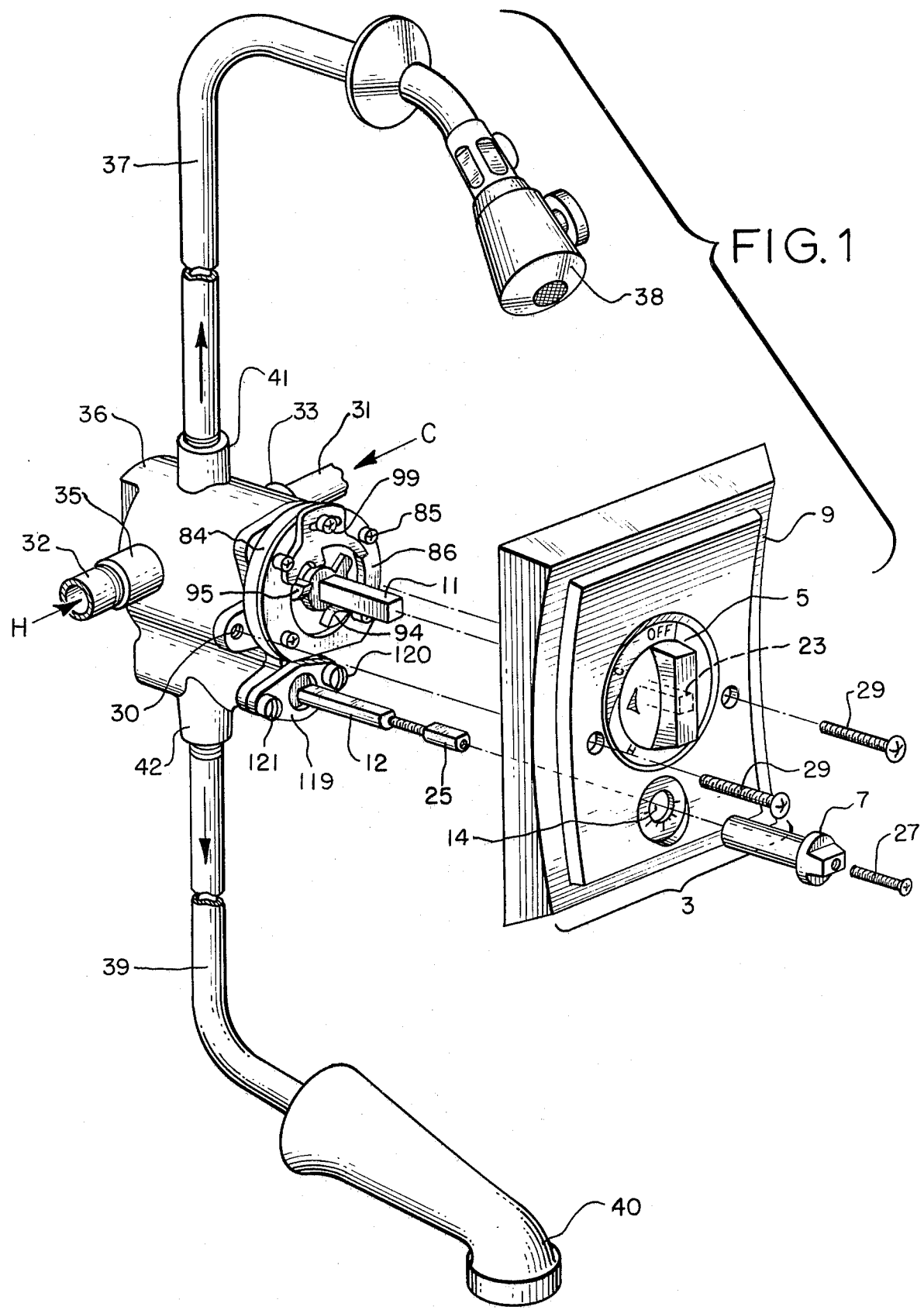
FIG. 1 is an exploded three-dimensional view of the improved valve of this invention.

The valve depicted in the figures represents one embodiment of the present invention. Referring now to FIG. 1, a valve fixture 3 includes a temperature and on-off dial 5 and a hollow diverter button 7. When the valve is assembled, the dial 5, rotatably mounted on the valve enclosure 9, engages a shaft 11 and the diverter button 7 engages a stem 12 of slideable member 13 through a circular opening 14. The shaft 11, having a cross-section in the shape of a square, fits closely inside a square-shaped hollow 23 extending through the center of the dial 5. An extension arm 25 is coaxially threaded into the outer end of the stem 12. The otherwise cylindrical arm 25 and the stem 12 have flat surfaces extending along their lengths. The button 7 fits closely around both the arm 25 and the outer end of the stem 12 and is secured thereto by a screw 27. The shape of a hollow 28 inside the button 7 corresponds to the shape of the cylindrical arm 25 and that of the stem 12; the flat surface of hollow 28 mates with those of arm 25 and stem 12 permitting rotation of the slideable member 13 by turning the diverter button 7. The valve fixture 3 is secured to a wall by screws 29 which fit into threaded bores 30.

The cold and hot water pipes 31 and 32 are threaded into tubular bosses 33 and 35, respectively, which are aligned with each other and located on opposite sides of the valve housing 36. A shower outlet pipe 37, leading to the shower head 38, and a bathtub pipe 39 leading to the faucet 40 are threaded into tubular bosses 41 and 42, respectively. The bosses 41 and 42 are also on opposite sides of the valve housing 36, with their axes aligned with respect to each other but perpendicular with respect to the axes of bosses 33 and 35.

Figure 4:
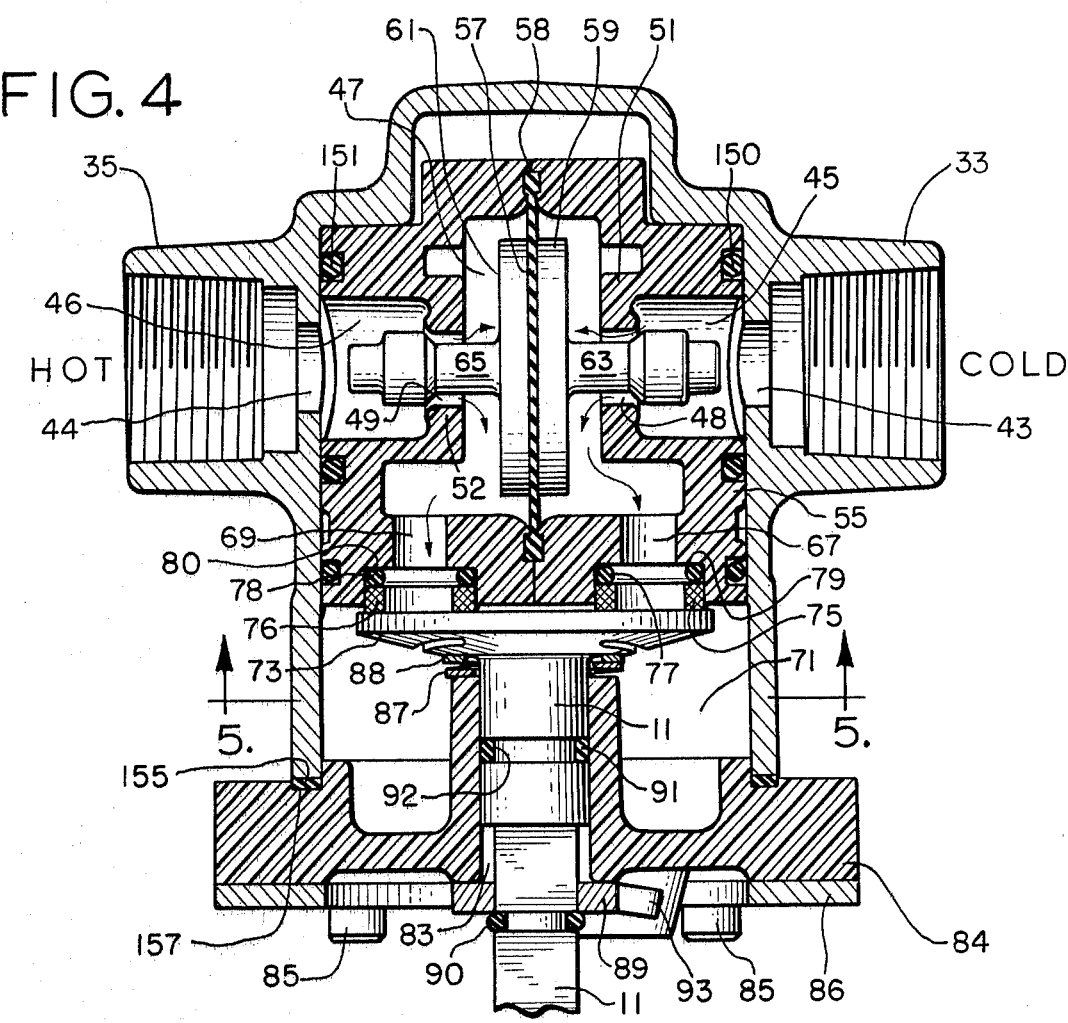
FIG. 4 is a side cross-sectional view of the valve taken along line 4—4 of FIG. 2.

As shown in FIG. 4, the interiors of bosses 33 and 35 are connected by conduits 43 and 44 with identical inlet chambers 45 and 46. The inlet chambers 45 and 46 communicate with a control chamber 47 through cylindrical inlet passages 48 and 49 respectively, defined by lips 51 and 52 in a wall of casing 55. The casing 55 is composed of two identical sections secured together by appropriate bolts 56. A circular flexible plate 57, extending across the control chamber 47, subdivides that chamber into two identical compartments. The edges of plate 57 fit between the two sections of the casing 55 in a notch 58 and are held securely there by the force of friction. Attached on either side of the flexible plate and concentric therewith are two solid plates 59 and 61, each having a cylindrical projection, 63 and 65 respectively, extending in the direction normal to the surface of the solid plates 59 and 61, through the inlet passages 48 and 49 into the inlet chambers 45 and 46. Near their outer ends, each cylindrical projection 63 and 65 has a portion of enlarged diameter, slightly smaller than the diameter of inlet passages 48 and 49. Flexible plate 57, plates 59 and 61, and projection 63 and 65 together form a balancing poppet.

Figure 2:
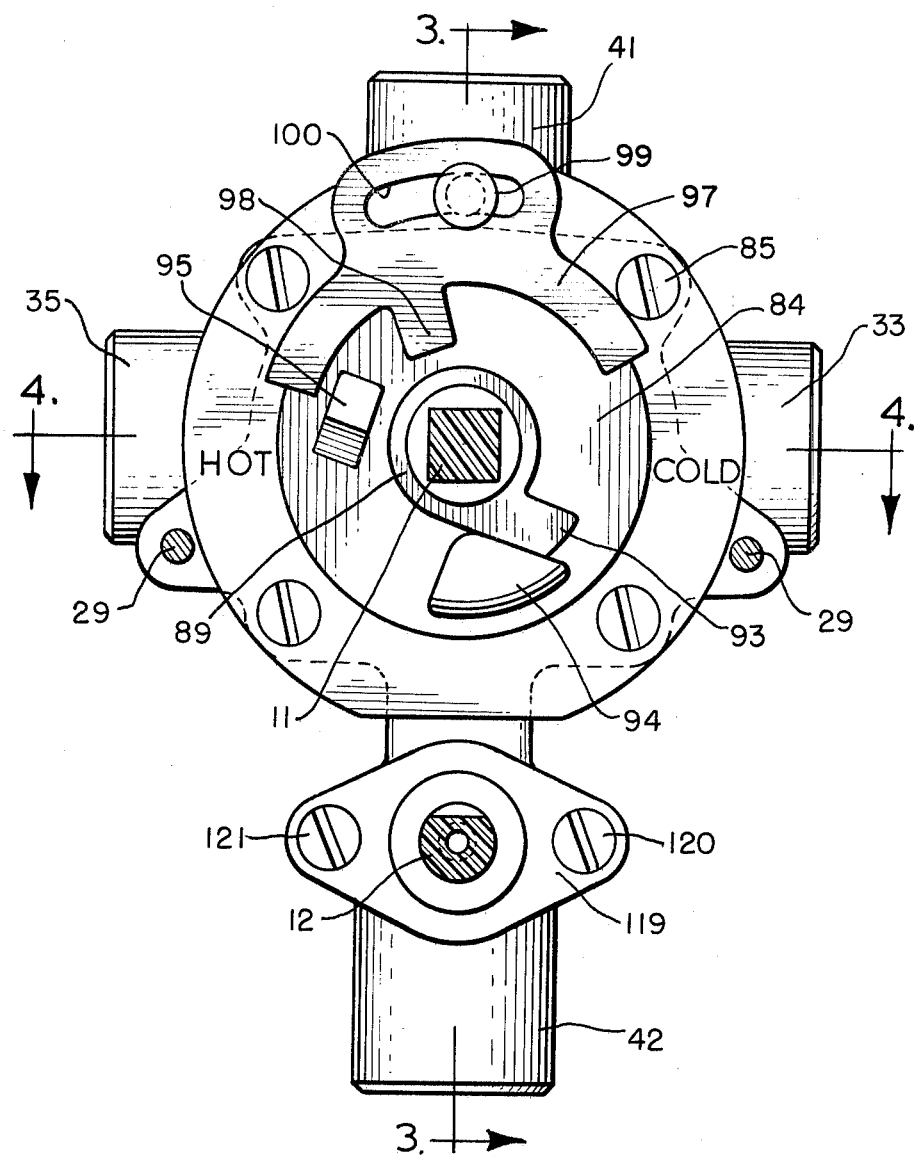
FIG. 2 is a front view of the mixing valve without the fixture.
Figure 5:
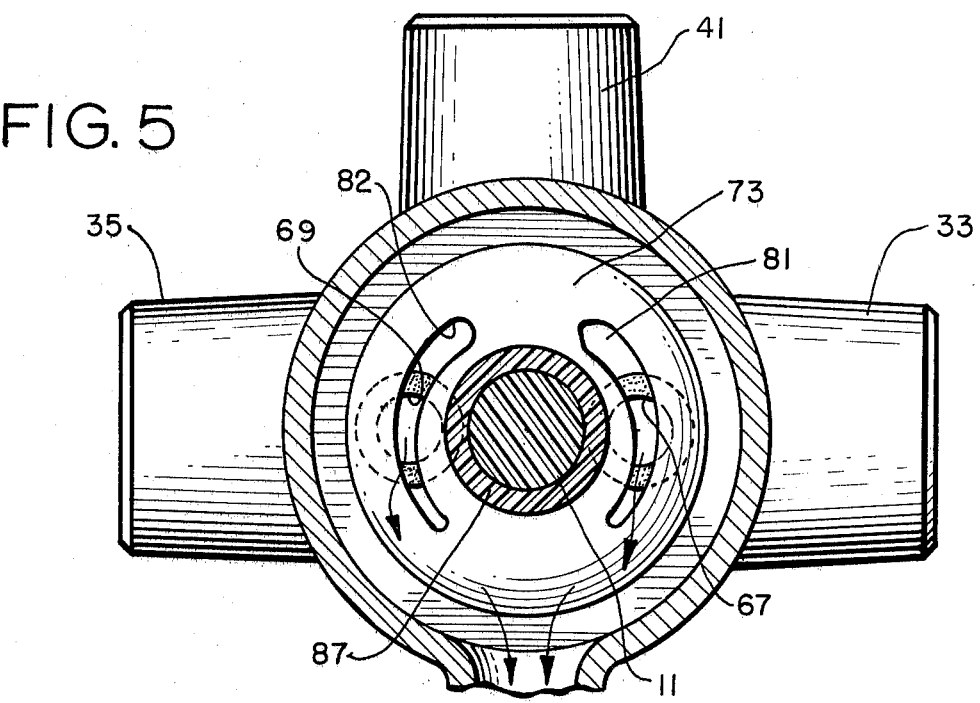
FIG. 5 is an elevational view taken along line 5—5 of FIG. 4.

Bores 67 and 69 permit communication of each of the compartments with the mixing chamber 71. The communication via bores 67 and 69 can be restricted or closed-off by a mixing plate 73 which fits tightly against rubber gaskets 75 and 76 which rest on ring gaskets 77 and 78, secured in annular recesses 79 and 80, respectively. As depicted in FIG. 5, slots 81 and 82 through the mixing plate 73 are in a location corresponding to that of bores 67 and 69. The mixing plate 73 is attached to the shaft 11 which is cylindrical in shape at the mixing plate end and has a square cross-section at the other end. The shaft 11 is rotatably mounted in a bore 83 extending through the housing cover 84. The cover 84 is mounted to the valve housing 36 by bolts 85, extending through a flat brace 86. The shaft 11 is prevented from sliding in bore 83 by a resilient washer 87 resting on a gasket 88 and forcing the shaft 11 against the lock nut 89 and rubber ring 90 placed on the cylindrical part of shaft 11 next to the square cross-section part. A resilient rubber gasket 91 in a groove 92 prevents water from leaking between the shaft 11 and the bore 83. A finger 93 of lock nut 89 restricts the rotation of the shaft 11 to arcs between projections 94 and 95. Depending on the orientation of the slots 81 and 82, varying amounts of hot and cold water are admitted through bores 67 and 69 into the mixing chamber 71. A rotation restricting brace 97, having a finger 98, can be secured to the housing 36 by a bolt 99 to further restrict the rotation of the shaft, thereby limiting the maximum temperature of the water leaving the mixing chamber 71. The maximum allowable temperature can be adjusted by positioning the bolt 99 in different locations of the slot 100. Since the finger 98 is not in the center of the brace 97, an additional range of maximum temperatures can be obtained by placing the brace 97 in an upside-down position from that shown in FIG. 2.

Figure 3:
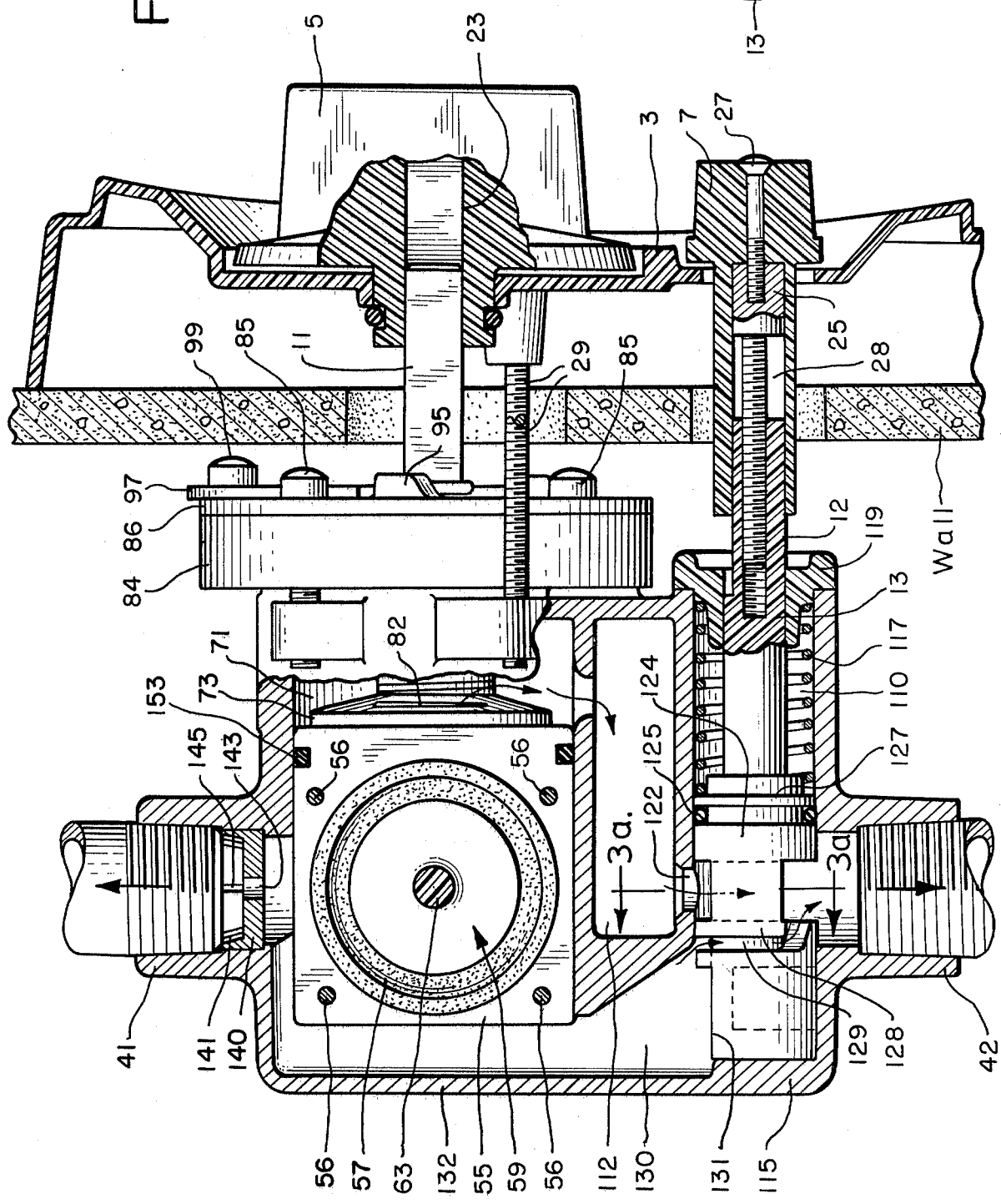
FIG. 3 is a side-elevational view of the mixing valve taken along the line 3—3 of FIG. 2.

As shown in FIG. 3, the mixing chamber 71 communicates with a diverter bore 110 via mixing conduit 112. The member 13 is slideably disposed within the diverter bore 110. In its retracted position, the inner end of the member 13 is held tightly against the housing wall 115 by the resilience of a coil spring 117, which is disposed coaxially around the stem 12 of member 13 and which is held in place by a diverter cover 119 secured to the housing by bolts 120 and 121. As shown in FIGS. 3 and 3A, in the retracted position an exit passageway 122 communicates with the interior of the boss 43 via a hole 123. The communication of exit passageway 122 with the inner end of diverter bore 110 is prevented on one side by the enlarged portion 124 of the member 13 fitting closely against the bore walls and by a gasket 125 held in groove 127, and on the other side by an enlarged portion 128 fitting closely against the walls of the diverter bore 110. The communication with the interior of the boss 42 can be restricted or closed-off by rotation of the slideable member 13. Regardless of the angular position of hole 123 with respect to exit passageway 122, a groove 129 allows drainage of water contained in an exit duct 130 into the interior of boss 42.

In its extended position, the enlarged portion 128 of the slideable member 13 closes off the entrance to the interior of boss 43, but the communication with the exit duct 130 leading to the interior of boss 41, is established when a flat portion 131 of the member is directly across from the exit passageway 122. By rotation of the slideable member 13, this communication can be restricted or entirely closed-off. The exit duct 130 is defined by the housing wall 132 and the casing 55, thereby allowing savings of space and materials. A circular restriction 140, placed in the interior of the boss 41, is held in place by a resilient cap 141. Holes 143 and 145 in the center of the restriction 140 and cap 141, respectively, are concentric with respect to each other.

The valve is easily constructed and installed. The flexible plate 57 of the balancing poppet is placed between the two sections of the casing 55 with its edges in the notch 58 and the two sections are secured together by bolts 56. Since the enlarged portions of the cylindrical projections 63 and 65 are smaller in diameter than the inlet passages 47 and 49, the balancing poppet can be assembled prior to placing it inside the casing 55. Gaskets 150, 151 and 153 are then placed into casing 55 and the casing 55 is inserted inside valve housing 36.

A resilient rubber gasket 91 is placed in an annular groove 92 of shaft 11. Gasket 88 and a resilient washer 87 are then slid down the shaft 11, until they rest against the mixing plate 73. The shaft 11 is then inserted into bore 83 of the housing cover 84. Next, lock nut 89 is slid down shaft 11 together with rubber ring 90. Rubber ring 90 placed just below the square-shaped portion of shaft 11 on a cylindrical portion thereof holds lock nut 89 against the face of housing cover 84. The gasket 155 is then inserted in the annular groove 157 of housing cover 84 and the housing cover 84 is secured to valve housing 36 by four bolts 85, the mixing plate fitting closely against rubber gaskets 75 and 76. Finally, brace 97 is secured to the housing by bolt 99.

Gasket 125 is placed in groove 127, and slideable member 13 is inserted into the diverter bore 110. Spring 117 is placed around the stem 12 against the enlarged portion 124. The spring 117 is then compressed by the diverter cover 119 which is mounted ot the housing 36 by bolts 120 and 121. The arm 25 is next screwed into the outer end of stem 12. The valve is then threaded into pipes 31, 32, 37 and 39. The location of the arm 25 is adjusted depending on the distance of the valve from the fixture wall by screwing and unscrewing arm 25. The fixture 3 is then mounted on the wall by screws 29 in a position in which the shaft 11 fits inside the hollow 23 and the arm 25 extends through the circular opening 14. The diverter button 7 is then placed onto arm 25 and stem 12 and secured to arm 25 by the screw 27.

In operation, cold water brought by pipe 31 flows through the interior of boss 33, the inlet chamber 45 and inlet passage 48 into one section of control chamber 47. Hot water brought by pipe 32 flows through the interior of boss 35, the inlet chamber 46 and the inlet passage 49 into the other section of control chamber 47. The ratio of the hot and cold water entering the mixing chamber 71 from the two sections of the control chamber 45 is regulated by the position of the dial 5. In an off position, both bores 67 and 69 leading from the control chamber 91 to the mixing chamber 71, are closed by the mixing plate 73. As the dial 5 is rotated counter-clockwise, causing rotation of the mixing plate 73 at the end of the shaft 11, slot 81 is moved gradually into communication with the cold water bore 67. As the dial 5 is rotated further the maximum communication between cold water compartment of the control chamber 47 and the mixing chamber 71 is established.

A further counter-clockwise rotation results in the slot 82 being superposed over the hot water bore 69, allowing mixing of hot and cold water in the mixing chamber 71. A still further counter-clockwise rotation gradually closes off the cold water bore 67 and further opens up the hot water bore 69. The extent of allowed rotation is determined by the location of finger 98 on brace 97.

If the slideable member 13 is in its retracted position, water from the mixing chamber flows through the mixing conduit 112, the exit passageway 122, the hole 123 into the interior of boss 43 and therefrom to the faucet 40. The flow rate of water into the faucet can be controlled by rotating the diverter button 7. As the diverter is rotated from its fully open position, either clockwise or counter-clockwise, a portion of the exit passageway 122 becomes closed off by the member 13 causing flow rate through the faucet 40 to decrease. Rotation of about 90° results in total closing of the exit passageway 122.

If it is desired to direct water through the shower head 38, the diverter button 7 is pulled out causing the member 13 to slide into extended position. In this position, water flows from an exit passageway 122 between the flat portion 131 into the exit duct 130. The pressure of water acting against the slideable member 13 keeps it in the extended position; when the water flow ceases as the result of either closing of bores 67 and 69 or closing exit passageways 122, the action of the spring 117 pushes member 13 back into the retracted position. In the extended position water flows through holes 143 and 145 in the restriction 140 and the cap 141 into the shower pipe 37 and is discharged through the shower head 38. The flow rate of water going through the shower pipe 37 can be controlled by rotation of the diverter button 7. The rotation of button 7 causes rotation of member 13. As the enlarged non-flat wall of member 13 approaches exit passageway 122 it gradually closes it off causing the flow rate of water to decrease. When the diverter button is rotated approximately 90° from its position with a flat wall 131 directly opposite the exit passageway 122, the exit passageway 122 is closed off entirely stopping the flow of water through the shower 38. When the flow of water ceases, the spring 117 pushes member 13 back to its retracted position. In other words, spring 117 has sufficient resiliency to push member 13 to the retracted position but exerts less force than the total pressure exerted against it by water flowing through the end of the bore 110 and exit duct 130.

The water flow through either the faucet 40 or the shower head 38 can be stopped by rotation of the dial 7 to "off" position. In that position, neither slot 81 nor slot 82 is in communication with bores 67 and 69; thereby, mixing plate 73 prevents the flow of water into the mixing chamber 71.

If mixed water flows through either the shower head 38 or the faucet 40 and the pressure in one of the pipes changes, the balancing poppet adjusts the flow rate through the other pipe into the control chamber so as to hold the ratio of hot to cold water at a constant preselected level. For example, if the pressure in pipe 31 suddenly drops, the balancing poppet is forced to move toward the conduit 43. As the poppet moves toward that direction the enlarged portion of projection 65 gradually closes off the communication between hot water flowing in pipe 32 and the hot water compartment of the control chamber 47. The extent of movement of the balancing poppet depends on the magnitude of the pressure change. A large pressure drop in line 31 results in large displacement of the balancing poppet and a substantial restriction of the flow through the high pressure inlet passage.

Many changes and modifications will occur to those skilled in the art upon studying this disclosure. All changes within the spirit of this invention are intended to be included within its scope as defined by the appended claims.

I claim:

1. A valve for mixing, in a selected ratio, hot and cold water and for selectively directing mixed water to either a bathtub faucet or to a shower head, comprising:
 a control chamber;
 two inlet chambers on either side of the control chamber and communicating with the control chamber through inlet passages having smaller cross-sections than those of the inlet chambers;
 a flexible plate subdividing said control chamber into two compartments and having projections extending therefrom in a generally normal direction through the inlet passages, said projections having portions with enlarged cross-sections near their ends inside the inlet chambers;

a mixing chamber having two bores, each communicating with the different compartment of the control chamber and having an outlet exit;

temperature control means inside said mixing chamber, for restricting the communicating through each of the bores;

a diverter bore having in its cylindrical wall a first and a second outlet opening and an inlet opening, communicating with the outlet exit;

a diverter fitting closely inside the bore, one end of the otherwise cylindrical diverter having a flat side wall, said diverter having a hole through the other end, the hole extending in the direction perpendicular to the axis of the diverter; and actuating means for sliding the diverter into a first position in which the hole through the diverter provides communication between the inlet opening and the first outlet opening and for sliding the diverter into a second position in which the communication between the inlet opening and the second outlet opening is established through the volume between the flat side wall of the diverter and the conduit walls, and for rotating said diverter so as to partially or completely close the inlet opening in either of the two positions.

2. A valve as claimed in claim 1 wherein the portions with enlarged cross-sections have a cross-section permitting them to fit closely inside the inlet passages.

3. A valve as claimed in claim 1 wherein said temperature control means comprises:

a shaft having an inner and an outer end;

a mixing plate secured to the inner end of the shaft, said mixing plate having two slots therethrough;

said mixing plate disposed inside the mixing chamber and fitting tightly against the two bores, said slots being in the location corresponding to the location of the two bores, said outer end extending through and outside the mixing chamber.

4. A valve as claimed in claim 3 further comprising:

a housing enclosing the control chamber, inlet chambers, mixing chambers and the diverter bore, the inner wall of said housing and the outer wall of the control chamber defining an exit duct communicating with the second outlet opening.

5. A valve as claimed in claim 4 wherein the diverter has a groove around a cylindrical part of the flattened portion, said groove providing communication between the exit duct and the first outlet when the diverter is in the first position.

6. A valve as claimed in claim 1 wherein said actuating means comprises:

a diverter stem for rotating the diverter and for pulling the diverter into the second position;

a spring around said stem for holding the diverter in the first position the resiliency of the spring being less than the force exerted on the diverter by a liquid flowing through the diverter bore in the second position but sufficient to push the diverter into the first position when the flow of liquid is stopped.

* * * * *